US012594212B1

(12) United States Patent
Lu

(10) Patent No.: US 12,594,212 B1
(45) Date of Patent: Apr. 7, 2026

(54) HAND MASSAGER

(71) Applicant: Ningbo Chaoge Health Technology Co., LTD, Zhejiang (CN)

(72) Inventor: Yaqiu Lu, Zhejiang (CN)

(73) Assignee: Ningbo Chaoge Health Technology Co., LTD, Zhejiang (CN)

( * ) Notice: Subject to any disclaimer, the term of this patent is extended or adjusted under 35 U.S.C. 154(b) by 0 days.

(21) Appl. No.: 19/247,267

(22) Filed: Jun. 24, 2025

(51) Int. Cl.
*A61H 9/00* (2006.01)
*A61H 23/02* (2006.01)

(52) U.S. Cl.
CPC .......... *A61H 9/0078* (2013.01); *A61H 23/02* (2013.01); *A61H 2201/0103* (2013.01); *A61H 2201/0153* (2013.01); *A61H 2201/0176* (2013.01); *A61H 2201/1409* (2013.01); *A61H 2201/1638* (2013.01); *A61H 2201/5056* (2013.01); *A61H 2205/067* (2013.01)

(58) Field of Classification Search
CPC ................ A61H 9/0078; A61H 23/02; A61H 2201/0103; A61H 2201/0153; A61H 2201/0176; A61H 2201/1409; A61H 2201/1638; A61H 2201/5056; A61H 2205/067; A61H 9/0092; A61H 2205/065
See application file for complete search history.

(56) References Cited

U.S. PATENT DOCUMENTS

2020/0261308 A1* 8/2020 Zhou ..................... A61H 23/02
2021/0015699 A1* 1/2021 Zou ..................... A61H 9/0092

FOREIGN PATENT DOCUMENTS

CN 113599215 A * 11/2021 .......... A61H 9/0078

OTHER PUBLICATIONS

CN 113599215 Machine Translation (Year: 2021).*

* cited by examiner

*Primary Examiner* — Kendra D Carter
*Assistant Examiner* — Arielle Wolff
(74) *Attorney, Agent, or Firm* — Hawaii Patent Services; Nathaniel K. Fedde; Kenton N. Fedde

(57) ABSTRACT

The present disclosure relates to a hand massager, comprising: a first housing and a second housing, which are detachably connected; arc-shaped thumb holes arranged on the first housing and the second housing for insertion of a thumb; and a reset mechanism, comprising two fixing rods parallelly arranged on the first housing, as well as an elastic member and a movable block provided on each fixing rod; and a connection mechanism arranged between the two movable blocks and moving along with the movable blocks.

20 Claims, 7 Drawing Sheets

HAND MASSAGER

TECHNICAL FIELD

The present disclosure relates to the field of massage technology, particularly to a hand massager.

BACKGROUND

The human palm has numerous acupoints, and frequent massage of these acupoints is beneficial for physical and mental health. There are already specialized massage devices for hand massage on the market, but their functions are relatively simple, generally limited to squeezing actions, such as pressing specific areas of the hand. Traditional hand massagers offer a monotonous massage method, resulting in poor user experience, failing to meet usage demands, and affecting sales.

As revealed in U.S. Patent US20210015699A1, the glove massager uses a ring-shaped airbag design that allows fingers to pass through, enabling simultaneous massage of the user's palm and fingers. However, this device is still confined to a single massage method, providing an unsatisfactory experience and likewise failing to meet the diverse needs of different customers.

SUMMARY

The present disclosure provides a hand massager to address the issues raised in the aforementioned background.

A hand massager comprises a first housing and a second housing that are detachably connected; arc-shaped thumb holes arranged on the first housing and the second housing for insertion of a thumb; a reset mechanism, comprising two fixing rods parallelly arranged on the first housing, as well as an elastic member and a movable block provided on each fixing rod; a connection mechanism arranged between two movable blocks and moving along with the movable blocks; an airbag mechanism that is arranged inside the first housing and the second housing and is detachably connected to the connection mechanism; and a drive mechanism arranged on the first housing for driving the connection mechanism and the airbag mechanism to move.

A hand massager comprises a first housing and a second housing, wherein both sides of the first and second housings are provided with arc-shaped thumb holes for insertion of a thumb; a reset mechanism, comprising two fixing rods arranged in parallel on the first housing, as well as an elastic member and a movable block provided on each fixing rod; a connection mechanism arranged between the two movable blocks and moving along with the movable blocks; an airbag mechanism mounted on the connection mechanism, wherein the airbag mechanism comprises at least four independent airbag finger sleeves for accommodating fingers, the airbag finger sleeves are provided with a connecting plate, and distal ends of the airbag finger sleeves are connected as a whole via the connecting plate; and a drive mechanism arranged on the first housing, wherein the drive mechanism acts on the connection mechanism. The drive mechanism is configured to drive the connection mechanism to move the airbag mechanism away from the reset mechanism to stretch fingers when inflated, and the reset mechanism is configured to provide a restoring force to drive the connection mechanism to reset the airbag mechanism when the drive mechanism is deflated.

A hand massager comprises a first housing and a second housing that are detachably connected, with arc-shaped thumb holes provided on sidewalls thereof; a reset mechanism, comprising two fixing rods arranged in parallel on the first housing, as well as an elastic member and a movable block arranged on each fixing rod; a connection mechanism arranged between two movable blocks and moving along with the movable blocks; and an airbag mechanism, comprising at least four independent airbag finger sleeves, each with a connecting block at a proximal end thereof, wherein the connecting block is connected to the fixing plate. The reset mechanism is configured to drive the fixing plate and the connected airbag finger sleeves to move in a first direction when inflated, and drive the fixing plate and the connected airbag finger sleeves to move in a second direction opposite to the first direction when deflated, thereby forming a reciprocating massage motion.

To achieve the above inventive object, the present disclosure adopts the following technical solution:

When a user inserts his thumb through the arc-shaped thumb hole and places the other four fingers into the airbag finger sleeves, the second control valve is connected to an air pump to inflate the airbag finger sleeves, clamping the fingers. The first control valve is connected to the air pump to fill the pushing airbag with gas, pushing the base plate upward. The fixing plate drives the movable block to slide along the sliding rod and compresses the elastic member, while the fixing plate moves the connecting block and airbag finger sleeves via the clamping rod. After the airbag finger sleeves move the fingers a certain distance, the air pump stops inflating the pushing airbag and extracts the gas. At this point, the connection mechanism resets under the action of the elastic member. The air pump continues inflating the pushing airbag, causing the airbag finger sleeves to perform reciprocating motion for finger massage. The movement is smooth and free from deviation.

BRIEF DESCRIPTION OF DRAWINGS

The drawings, which form part of this application, are provided for further understanding of the disclosure. The illustrative embodiments and descriptions thereof are intended to explain the disclosure and do not constitute undue limitations. In the drawings.

Figure 1:
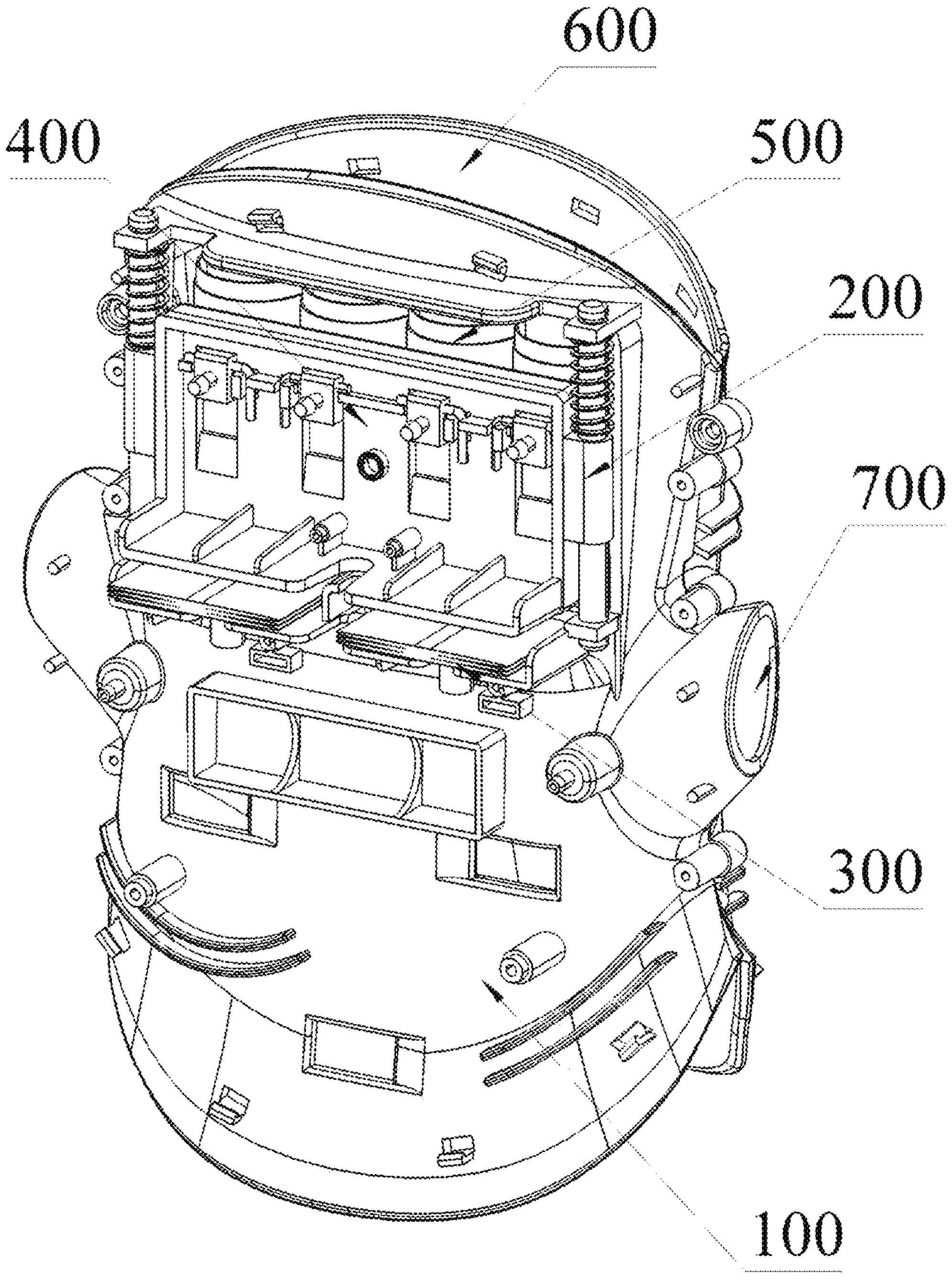
FIG. 1 is a perspective view of an embodiment provided by the disclosure.

Reference signs: First housing (100); Reset mechanism (200); Fixing rod (201); insertion rod (2011); Stopping rod (2012); Sliding rod (2013); Elastic member (202); Movable block (203); Fixed block (204); Drive mechanism (300); Horizontal plate (301); First control valve (302); Pushing airbag (303); Connection mechanism (400); Fixing plate (401); Base plate (402); Through hole (403); Reinforcing rib (404); Clamping block (405); Clamping rod (406); Airbag mechanism (500); Airbag finger sleeve (501); Connecting block (502); Second control valve (503); Connecting plate (504); Clamping hole (505); Second housing (600); Arc-shaped thumb hole (700).

DESCRIPTION OF EMBODIMENTS

The technical solution in the embodiment of the present disclosure will be clearly and completely described below with reference to the drawings. Obviously, the described embodiment is part of, rather than all of the embodiments of the present disclosure. The following description of at least one exemplary embodiment is illustrative in nature and is in no way intended to limit the present disclosure, its application or uses. Based on the embodiments in the present disclosure, all other embodiments obtained by those skilled in the art without creative work belong to the scope of protection of the present disclosure.

It should be noted that the terminology used here is only for describing specific embodiments, and is not intended to limit exemplary embodiments according to the present application. As used herein, the singular form is also intended to include the plural form unless the context clearly indicates otherwise. Furthermore, it should be appreciated that when the terms "comprising" and/or "including" are used in this specification, they specify the presence of features, steps, operations, devices, components and/or combinations thereof.

Unless otherwise specified, the relative arrangement of components and steps, numerical expressions and numerical values set forth in these embodiments do not limit the scope of the present disclosure. At the same time, it should be appreciated that for the convenience of description, the dimensions of various parts shown in the drawings are not drawn according to the actual scale relationship. Techniques, methods and equipment known to those skilled in the art may not be discussed in detail, but in appropriate cases, they should be regarded as part of the authorization specification. In all the examples shown and discussed herein, any specific values should be interpreted as illustrative, and not as limiting. Therefore, other examples of exemplary embodiments may have different values. It should be noted that similar numbers and letters indicate similar items in the following drawings, therefore once an item is defined in one drawing, it does not need to be further discussed in subsequent drawings.

Figure 2:
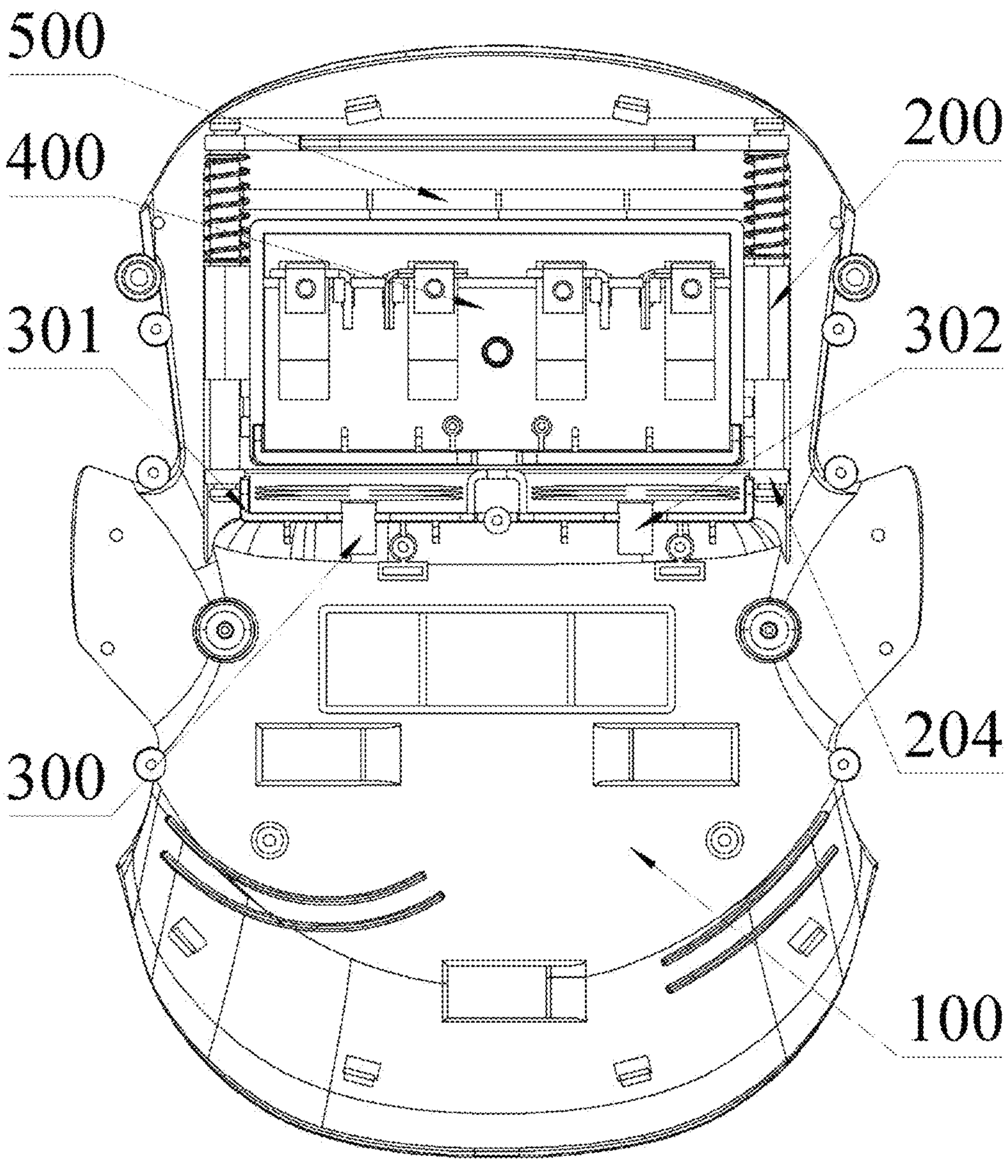
FIG. 2 is a structural schematic of the embodiment shown in FIG. 1.

As shown in FIGS. 1 and 2, a hand massager includes a first housing 100 and a second housing 600. The first housing 100 and the second housing 600 are detachably connected via a snap-fit structure, facilitating quick assembly and disassembly of the first housing 100 and the second housing 600. Arc-shaped thumb holes 700 are provided on both sides of the first housing 100 and the second housing 600. Two arc-shaped thumb holes 700 form a circular hole when combined to accommodate the thumb. A reset mechanism 200 is installed on the first housing 100.

The reset mechanism 200 is connected to a connection mechanism 400, and the reset mechanism 200 drives the connection mechanism 400 to move. The connection mechanism 400 includes an airbag mechanism 500 located inside the first housing 100 and the second housing 600. Fingers are placed into the airbag mechanism 500, which clamp the fingers when inflated. The first housing 100 also features a drive mechanism 300 to move the connection mechanism 400 and the airbag mechanism 500. The reset mechanism 200 returns the connection mechanism 400 and the airbag mechanism 500 to their original positions, while the drive mechanism 300 continues to push the connection mechanism 400 and the airbag mechanism 500 to move, creating a reciprocating motion for hand massage.

In other embodiments (not shown), an infrared sensor is installed on the inner wall of the arc-shaped thumb hole 700. When the diameter of a thumb is detected to be <35 mm, the power of the drive mechanism 300 is automatically cut off. A physical knob lock is added to the housing side, which needs to rotate by 90° to unlock, preventing accidental activation by children and potential finger strain.

In other embodiments (not shown), the buckle of the first housing 100 consists of an angled guide post+an elastic member steel ball. When the second housing 600 is inserted, the angled guide post compresses the steel ball, which then snaps into a locking slot upon alignment, which is simple in assembly and convenient for installation.

Figure 3:
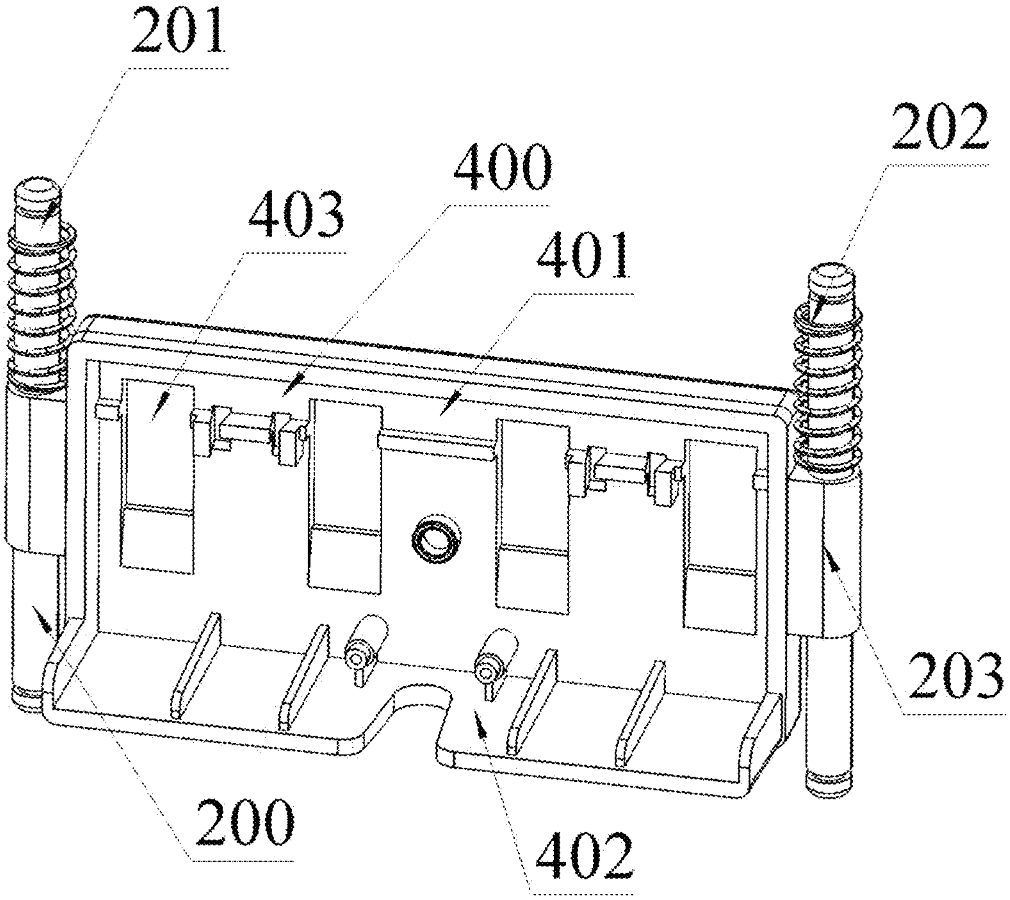
FIG. 3 is a perspective view of the reset mechanism and connection mechanism in the embodiment shown in FIG. 1.
Figure 4:
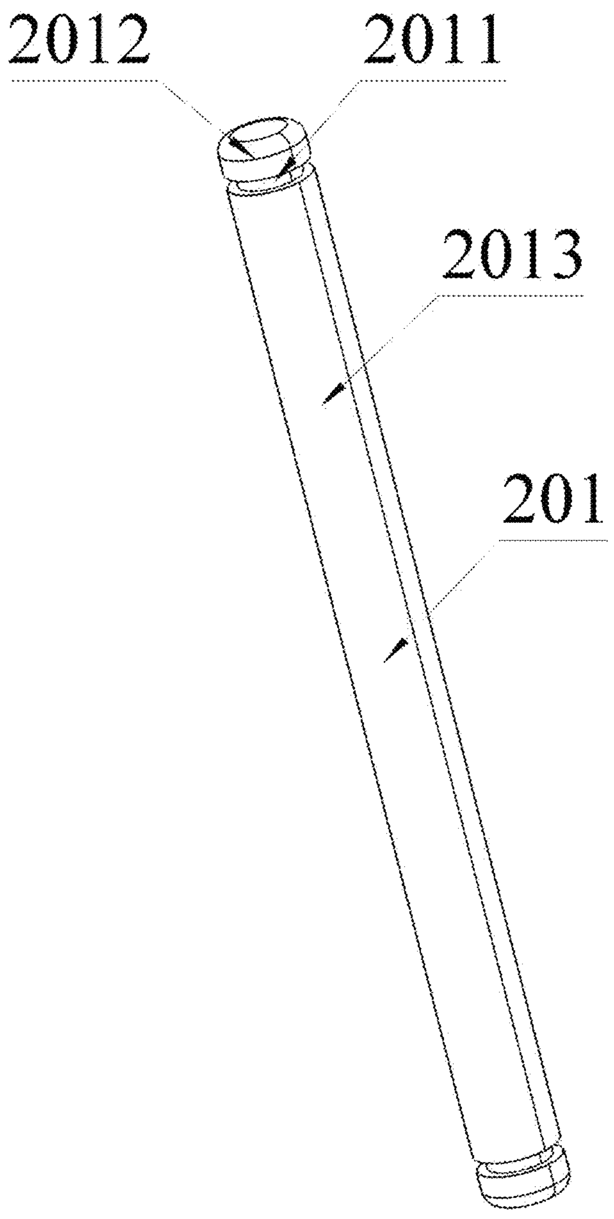
FIG. 4 is a perspective view of the fixing rod in the embodiment shown in FIG. 3.

As shown in FIGS. 2, 3, and 4, the reset mechanism 200 includes a plurality of fixed blocks 204 secured to the first housing 100. Each fixed block 204 contains a fixing rod 201. The fixing rod 201 consists of an insertion rod 2011, a stopping rod 2012, and a sliding rod 2013. The insertion rod 2011 is embedded into a limiting hole in the fixed block 204, while the stopping rod 2012, with a larger diameter than the insertion rod 2011, prevents dislodging. A movable block 203 and an elastic member 202 are sleeved onto the sliding rod 2013. The movable block 203 and the sliding rod 2013 have a clearance fit to enhance the precision of the movable block 203 moving on the sliding rod 2013. The two ends of the elastic member 202 abut against the end faces of the fixed block 204 and the movable block 203, resetting the movable block 203 via the elastic member 202.

In other embodiments (not shown), the sliding rod 2013 of the reset mechanism 200 is replaced with a ceramic-coated guide rail, and the bottom of the movable block 203 is equipped with a PTFE sliding groove matching the guide rail. Both ends of the guide rail are fixed to the fixed block 204 via laser welding, and the elastic member 202 is replaced with a set of disc-shaped elastic members symmetrically distributed on both sides of the guide rail. This enhances wear resistance, eliminates metal friction noise, and the disc-shaped elastic members provide a more uniform reset force.

Figure 5:
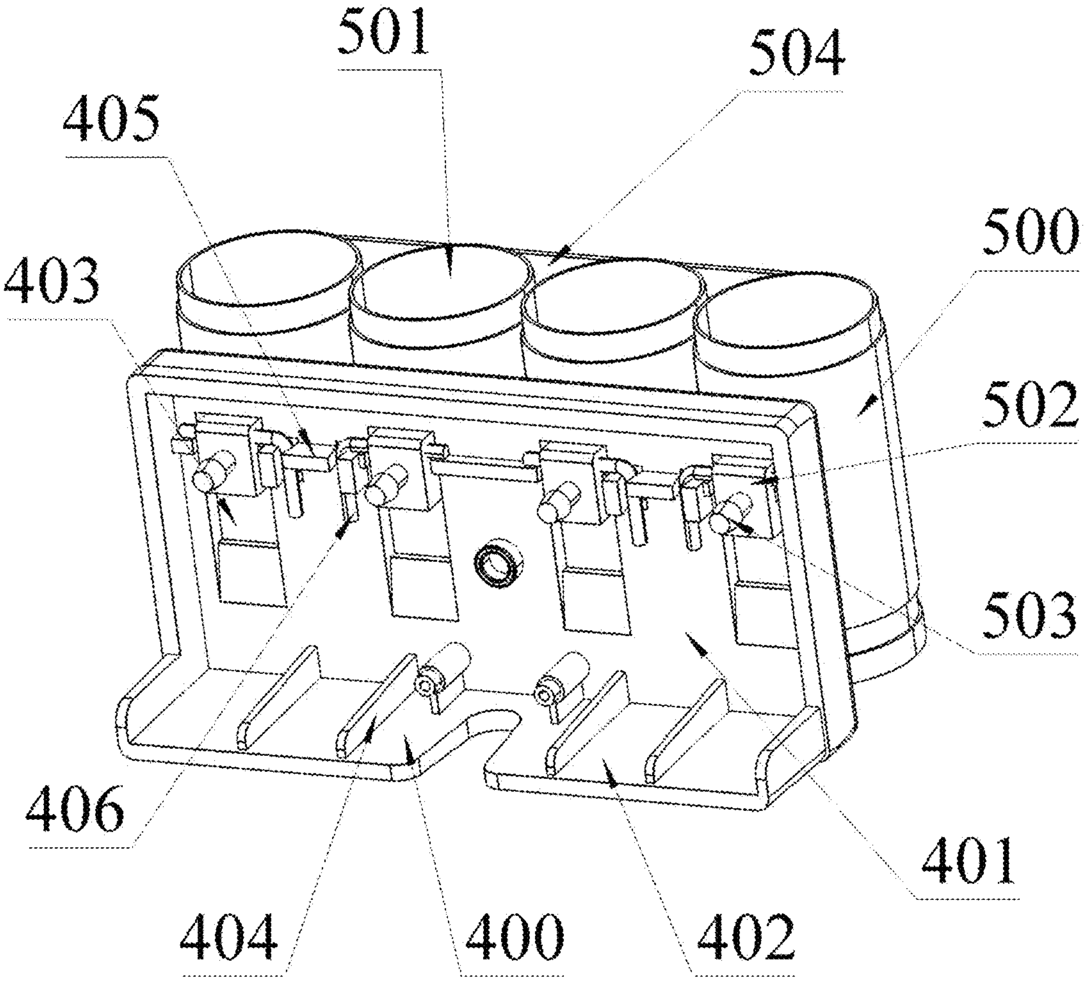
FIG. 5 is a perspective view of the connection mechanism and airbag mechanism in the embodiment shown in FIG. 1.

As shown in FIGS. 3 and 5, the connection mechanism 400 includes a fixing plate 401 secured between two movable blocks 203. The bottom of the fixing plate 401 is equipped with a base plate 402, and a plurality of reinforcing ribs 404 are arranged between the fixing plate 401 and the base plate 402. The fixing plate 401 and the base plate 402 are connected by triangularly distributed reinforcing ribs 404 to enhance bending stiffness. The fixing plate 401 is perforated with a plurality of through holes 403, and the edge of each through hole 403 is provided with an elastic silicone clamping block 405. A clamping rod 406 is engaged inside the clamping block 405. The clamping rod 406 is L-shaped and forms an interference fit with the internal groove of the clamping block 405.

Figure 6:
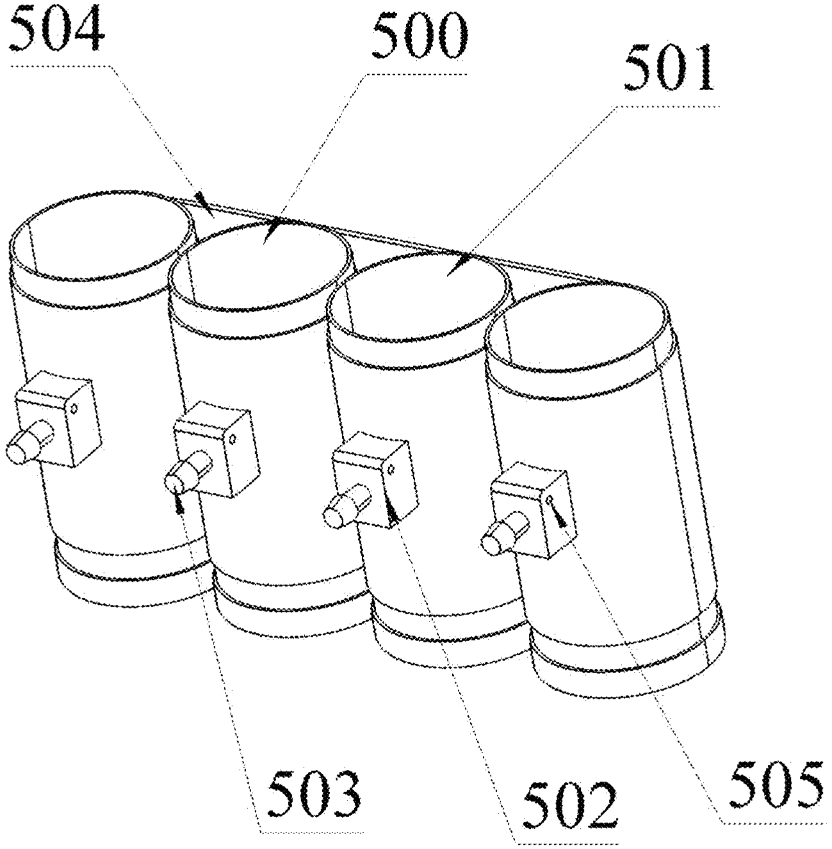
FIG. 6 is a perspective view of the airbag mechanism in the embodiment shown in FIG. 1.

As shown in FIGS. 5 and 6, the airbag mechanism 500 includes four independent medical silicone airbag finger sleeves 501. Each airbag finger sleeve 501 has a connecting block 502 at its proximal end, and the connecting block 502 maintains a clearance fit with the through hole 403. One end of the connecting block 502 is equipped with a second control valve 503. When connected to an external air pump, the second control valve 503 inflates the airbag finger sleeve 501 to clamp the fingers. The distal ends of the airbag finger sleeves 501 are interconnected as a whole via a flexible TPU connecting plate 504, ensuring that the airbag finger sleeves 501 remain linked. The side of the connecting block 502 is perforated with a clamping hole 505, into which the clamping rod 406 is inserted to lock the airbag finger sleeve 501 in place.

In other embodiments (not shown), the clamping rod 406 is improved into a magnetic quick-release structure. The end of the clamping rod 406 is embedded with a neodymium magnet, while the clamping hole 505 is lined with a ferrite adsorption layer. A toggle-type locking switch is added to the sidewall of the through hole 403 on the fixing plate 401, and it can be pushed to increase the distance between the magnet and the adsorption layer, reducing the replacement time of the airbag finger sleeves 501. The magnetic force ensures it does not detach during massage.

In other embodiments (not shown), piezoelectric ceramic discs are integrated into the inner wall of the airbag finger sleeve 501. These circular discs are distributed at positions corresponding to finger joints and are connected to a control module via microcircuits in the connecting block 502. The control module drives the piezoelectric discs to generate pulsed vibrations during the massage cycle, achieving a "stretching+vibration" composite massage with high precision in acupoint stimulation.

Figure 7:
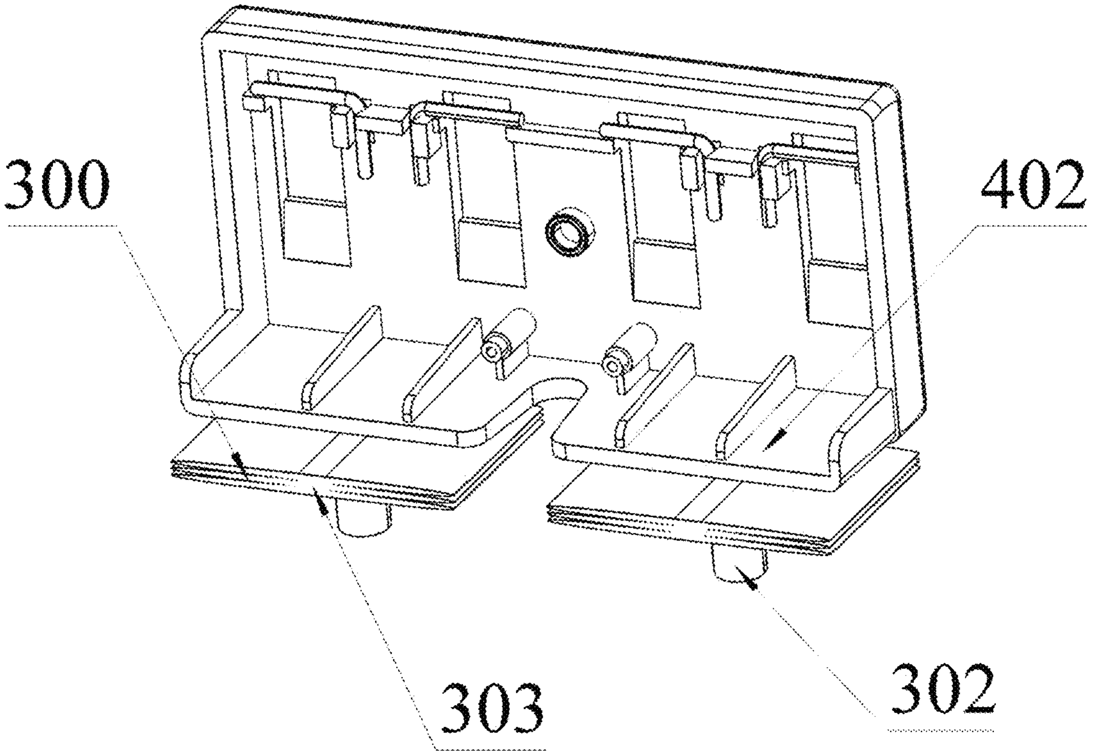
FIG. 7 is a perspective view of the drive mechanism in the embodiment shown in FIG. 1.

As shown in FIGS. 2, 6, and 7, the drive mechanism 300 includes a horizontal plate 301 fixed to the first housing 100. A first control valve 302 is embedded in the central hole of the horizontal plate 301, the top of the first control valve 302 is connected to a pushing airbag 303, and the pushing airbag 303 is located below the base plate 402. After the first control valve 302 is connected to an air pump, the pushing airbag 303 is inflated, pushing the base plate 402 to move and driving the airbag finger sleeve 501 to massage the fingers.

In other embodiments (not shown), the pushing airbag 303 of the drive mechanism 300 is modified to a dual-chamber structure. The upper chamber is connected to the first control valve 302 for inflation and pushing, while the lower chamber is connected to an independent pressure relief valve for rapid exhaust. The opening pressure of the relief valve is set to 80% of the reset force of the elastic member 202, increasing the reset speed by 40% and avoiding motion stutter caused by pressure fluctuations.

In other embodiments (not shown), a thin-film pressure sensor array is added to the bottom of the base plate 402 to monitor finger reaction force in real time. When the pressure is >50N, the air pump is controlled to reduce the inflation volume of the pushing airbag 303. If the pressure persists>80N, emergency pressure relief is triggered. Sensor data is transmitted via Bluetooth to a mobile app to generate safety reports. Dynamic adjustment of stretching amplitude reduces sports injury rates by 90%.

In other embodiments (not shown), a pressure sensor is added to the horizontal plate 301 and linked to an air pump control circuit. When ambient pressure is detected to be <70 kPa, the inflation flow rate is automatically increased. The pushing airbag 303 is equipped with an internal pressure-balancing membrane to ensure constant travel, keeping massage intensity deviation below 5% in high-altitude regions and solving pressure sensitivity challenges.

In other embodiments (not shown), a piezoelectric generator is installed between the elastic member 202 and the fixed block 204. Each compression of 1 mm of the elastic member 202 generates 0.2 W of electricity, which is stored in a supercapacitor inside the base plate 402. The capacitor-driven low-power mode enables 2 hours of off-grid operation, reducing external power consumption by 80% and earning carbon-neutral product certification.

The preferred embodiment provided by the present disclosure can be operated using the following method:

In summary, the present disclosure achieves the following technical effects: When a user inserts his thumb through the arc-shaped thumb hole 700 and fits the other four fingers into the airbag finger sleeves 501, the second control valve 503 is connected to an air pump to inflate the airbag finger sleeves 501, clamping the fingers. The first control valve 302 is connected to the air pump to inflate the pushing airbag 303, causing the base plate 402 to move upward. The fixing plate 401 drives the movable block 203 to slide along the sliding rod 2013 and compress the elastic member 202. Simultaneously, the fixing plate 401 drives the connecting block 502 and the airbag finger sleeves 501 via the clamping rod 406. After the airbag finger sleeves 501 move the fingers a certain distance, the air pump stops inflating the pushing airbag 303 and extracts the gas. At this point, the connection mechanism 400 resets under the action of the elastic member 202. The air pump continues inflating the pushing airbag 303, causing the airbag finger sleeves 501 to perform reciprocating motion, massaging the fingers. The movement process is stable and free from deviation.

In the description of the present disclosure, it should be appreciated that directional terms such as "front, rear, up, down, left, right", "horizontal, vertical, perpendicular, horizontal" and "top, bottom" etc. indicate the orientation or positional relationship based on the orientation or positional relationship shown in the drawings, and are only for the convenience of describing the present disclosure and simplifying the description. In the absence of a contrary explanation, these directional terms do not indicate or imply that the device or element referred to must have a specific orientation or be constructed and operated in a specific orientation, and therefore should not be understood as limiting the scope of protection of the present disclosure; the directional terms "inside, outside" refer to the inside and outside relative to the contour of each component itself.

For the convenience of description, spatial relative terms such as "on . . . ", "above . . . ", "on the upper surface of . . . ", "upper" etc. may be used here to describe the spatial positional relationship of a device or feature with other devices or features as shown in the drawings. It should be appreciated that spatial relative terms are intended to encompass different orientations of the device in use or operation other than the orientation described in the drawings. For example, if the device in the drawing is inverted, the device described as "above other devices or structures" or "on other devices or structures" will subsequently be positioned as "below other devices or structures" or "under other devices or structures". Thus, the exemplary term "above" can include both "above" and "below" orientations. The device can also be positioned in other different ways (rotated 90 degrees or in other orientations), and the spatial relative descriptions used here should be interpreted accordingly.

In addition, it should be noted that the use of terms such as "first", "second" etc. to define components is for the convenience of distinguishing the corresponding components. Unless otherwise stated, the above terms have no special meaning, and therefore should not be understood as limiting the scope of protection of the present disclosure.

The above description is only a preferred embodiment of the present disclosure and is not intended to limit the present disclosure. For those skilled in the art, the present disclosure can have various modifications and changes. Any modifications, equivalent replacements, improvements etc. made within the spirit and principles of the present disclosure should be included within the scope of protection of the present disclosure.

What is claimed is:

1. A hand massager, comprising:
- a first housing and a second housing that are detachably connected;
- arc-shaped thumb holes arranged on the first housing and the second housing configured for insertion of a thumb;
- a reset mechanism, comprising two fixing rods parallelly arranged on the first housing, as well as an elastic member and a movable block provided on each of the two fixing rods;
- a connection mechanism arranged between the two movable blocks and moving along with the two movable blocks;
- an airbag mechanism that is arranged inside the first housing and the second housing and is detachably connected to the connection mechanism; and
- a drive mechanism arranged on the first housing for driving the connection mechanism and the airbag mechanism to move.

2. The hand massager according to claim 1, wherein the drive mechanism comprises a horizontal plate fixed on the first housing, a first control valve is embedded inside the horizontal plate, and a top of the first control valve is connected to pushing airbags, wherein there are two pushing airbags that are parallelly arranged.

3. The hand massager according to claim 1, wherein the reset mechanism further comprises a plurality of fixed blocks secured on the first housing, each of the plurality fixed blocks is internally provided with one of the two fixing rods, and each of the fixing rods is sleeved with the respective movable block and elastic member, wherein the elastic member is a spring, and both ends of the elastic member abut against an end face of the fixed block and an end face of the movable block, respectively.

4. The hand massager according to claim 3, wherein each of the fixing rods comprises an insertion rod, a stopping rod, and a sliding rod, wherein the insertion rod is embedded in the fixed block, the stopping rod is arranged at an end of the insertion rod, the sliding rod is located between two insertion rods, and the movable block is sleeved on the sliding rod.

5. The hand massager according to claim 4, wherein a diameter of the stopping rod is larger than a diameter of the insertion rod.

6. The hand massager according to claim 3, wherein the connection mechanism comprises a fixing plate secured between the two movable blocks, a base plate is arranged at a bottom of the fixing plate, and a plurality of reinforcing ribs are provided between the fixing plate and the base plate.

7. The hand massager according to claim 6, wherein the connection mechanism further comprises a plurality of through holes formed on the fixing plate, an edge of each through hole is provided with an elastic silicone clamping block, and an interior of the clamping block is engaged with a clamping rod.

8. The hand massager according to claim 7, wherein the airbag mechanism comprises four independent airbag finger sleeves, each airbag finger sleeve having a connecting block at a proximal end thereof, one end of the connecting block is provided with a second control valve, and distal ends of the airbag finger sleeves are connected as a whole via a connecting plate.

9. The hand massager according to claim 8, wherein the airbag mechanism further comprises a clamping hole formed on a side of the connecting block, and the clamping rod is inserted into the clamping hole.

10. The hand massager according to claim 8, wherein the airbag finger sleeves are configured to correspond to an index finger, a middle finger, a ring finger, and a little finger, respectively.

11. A hand massager, comprising:
- a first housing and a second housing, wherein both sides of the first and second housings are provided with arc-shaped thumb holes configured for insertion of a thumb;
- a reset mechanism, comprising two fixing rods arranged in parallel on the first housing, as well as an elastic member and a movable block provided on each of the two fixing rods;
- a connection mechanism arranged between the two movable blocks and moving along with the two movable blocks;
- an airbag mechanism mounted on the connection mechanism, wherein the airbag mechanism comprises at least four independent airbag finger sleeves configured for accommodating fingers, the airbag finger sleeves are provided with a connecting plate, and distal ends of the airbag finger sleeves are connected as a whole via the connecting plate; and
- a drive mechanism arranged on the first housing, wherein the drive mechanism acts on the connection mechanism;
- wherein the drive mechanism is configured to drive the connection mechanism to move the airbag mechanism away from the reset mechanism to stretch fingers when inflated, and the reset mechanism is configured to provide a restoring force to drive the connection mechanism to reset the airbag mechanism when the drive mechanism is deflated.

12. The hand massager according to claim 11, wherein the reset mechanism further comprises a fixed block secured to the first housing; one of the two fixing rods is fixedly arranged on the fixed block; the respective movable block is slidably sleeved on the fixing rod, the connection mechanism being fixedly connected to the movable block; and the respective elastic member is sleeved on the fixing rod, one end of the elastic member abutting against the fixed block and the other end abutting against the movable block.

13. The hand massager according to claim 12, wherein the fixing rod comprises an insertion rod, a stopping rod, and a sliding rod with different diameters, wherein the insertion rod is embedded in the fixed block, the stopping rod has a larger diameter than the insertion rod to prevent the fixing rod from dislodging, and the movable block is slidably sleeved on the sliding rod with a clearance fit.

14. The hand massager according to claim 12, wherein the connection mechanism comprises:
- a fixing plate fixedly connected to the movable block of the reset mechanism;
- a base plate arranged at a distance from the fixing plate; and
- a plurality of reinforcing ribs connected between the fixing plate and the base plate, wherein the plurality of reinforcing ribs are distributed in a triangular pattern to enhance a bending stiffness of the connection mechanism;
- wherein the drive mechanism acts on the base plate.

15. The hand massager according to claim 14, wherein the fixing plate is provided with a plurality of through holes, an edge of each through hole is equipped with a clamping block, and an interior of the clamping block is provided with a groove;

the airbag mechanism further comprises a connecting block arranged at a proximal end of each airbag finger sleeve, with a clamping hole formed on a side of the connecting block; the connection mechanism further comprises a L-shaped clamping rod, one end of which is inserted into the groove of the clamping block to form an interference fit, and the other end is inserted into the clamping hole of the connecting block to achieve detachable locking between the airbag finger sleeve and the connection mechanism.

16. The hand massager according to claim 14, wherein the drive mechanism comprises a horizontal plate fixed to the first housing, a first control valve is embedded inside the horizontal plate, and a top of the first control valve is connected to pushing airbags, wherein there are two pushing airbags that are arranged in parallel and located below the base plate.

17. The hand massager according to claim 11, wherein there are four airbag finger sleeves, which are configured to correspond to an index finger, a middle finger, a ring finger, and a little finger, respectively.

18. A hand massager, comprising:

a first housing and a second housing that are detachably connected, with arc-shaped thumb holes provided on sidewalls thereof;

a reset mechanism, comprising two fixing rods arranged in parallel on the first housing, as well as an elastic member and a movable block arranged on each fixing rod;

a connection mechanism arranged between the two movable blocks and moving along with the two movable blocks; and an airbag mechanism, comprising at least four independent airbag finger sleeves, each with a connecting block at a proximal end thereof, wherein the connecting block is connected to a fixing plate;

wherein the reset mechanism is configured to drive the fixing plate and the connected airbag finger sleeves to move in a first direction when inflated, and drive the fixing plate and the connected airbag finger sleeves to move in a second direction opposite to the first direction when deflated, thereby forming a reciprocating massage motion.

19. The hand massager according to claim 18, wherein distal ends of the airbag finger sleeves are provided with a connecting plate, and the airbag finger sleeves are connected as a whole via the connecting plate, wherein a width of the connecting plate covers a distribution area of all airbag finger sleeves.

20. The hand massager according to claim 18, further comprising a drive mechanism arranged on the first housing, wherein the drive mechanism comprises a horizontal plate fixed to the first housing, a first control valve is embedded inside the horizontal plate, and a top of the first control valve is connected to pushing airbags, wherein there are two pushing airbags that are arranged in parallel.

* * * * *